Dec. 12, 1950     C. H. LEMKE     2,533,593
CATION EXCHANGE PROCESS
Filed Feb. 11, 1948     4 Sheets-Sheet 1
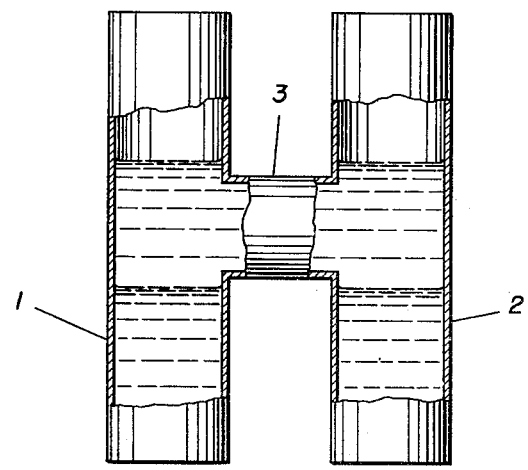
Fig. I
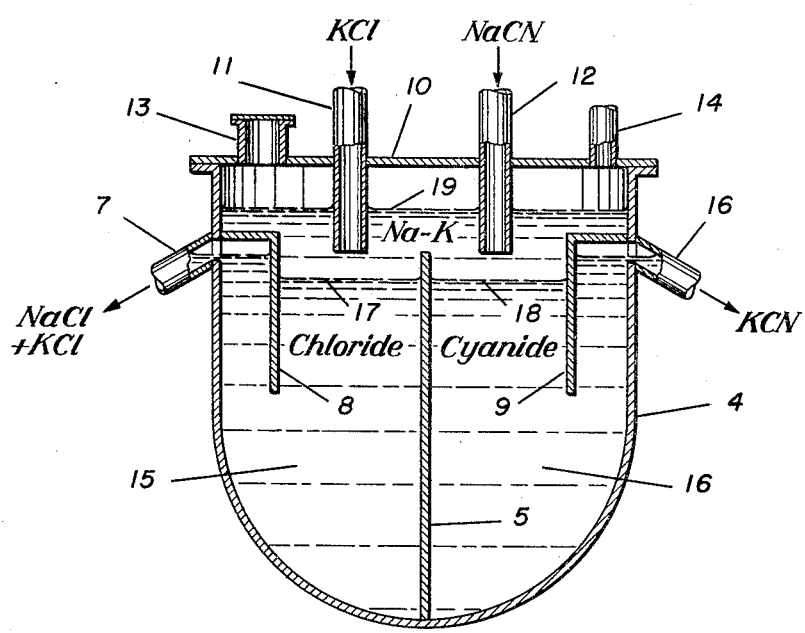
Fig. II
INVENTOR.
CHARLES H. LEMKE
BY
ATTORNEY Dec. 12, 1950   C. H. LEMKE   2,533,593
CATION EXCHANGE PROCESS
Filed Feb. 11, 1948   4 Sheets-Sheet 2
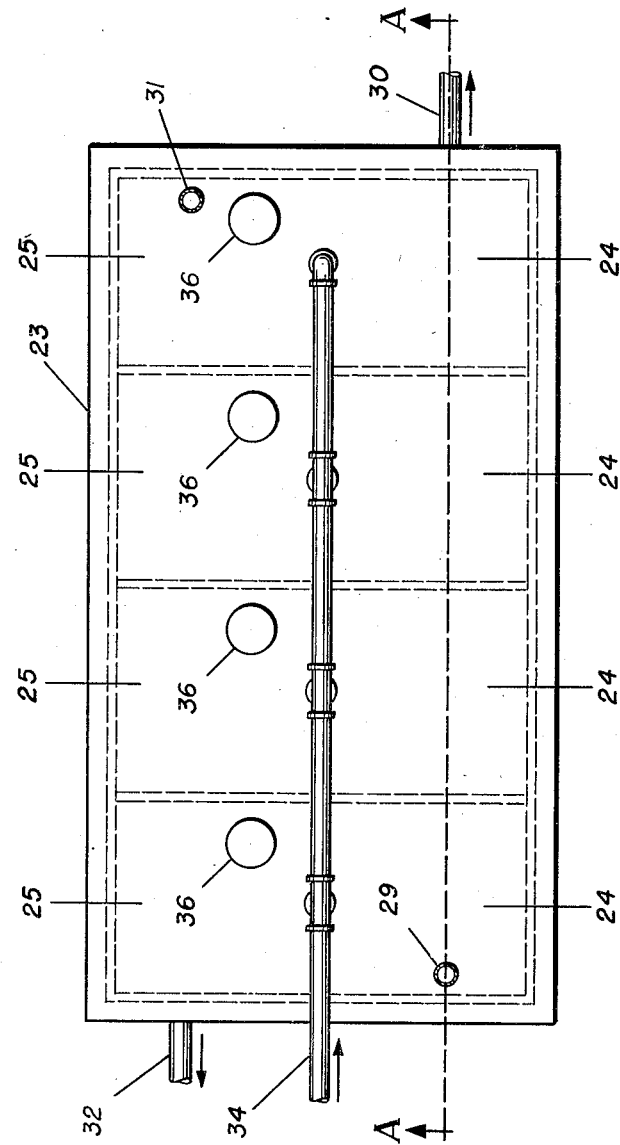
Fig. III
INVENTOR.
CHARLES H. LEMKE
BY
ATTORNEY Dec. 12, 1950 C. H. LEMKE 2,533,593
CATION EXCHANGE PROCESS
Filed Feb. 11, 1948 4 Sheets-Sheet 3
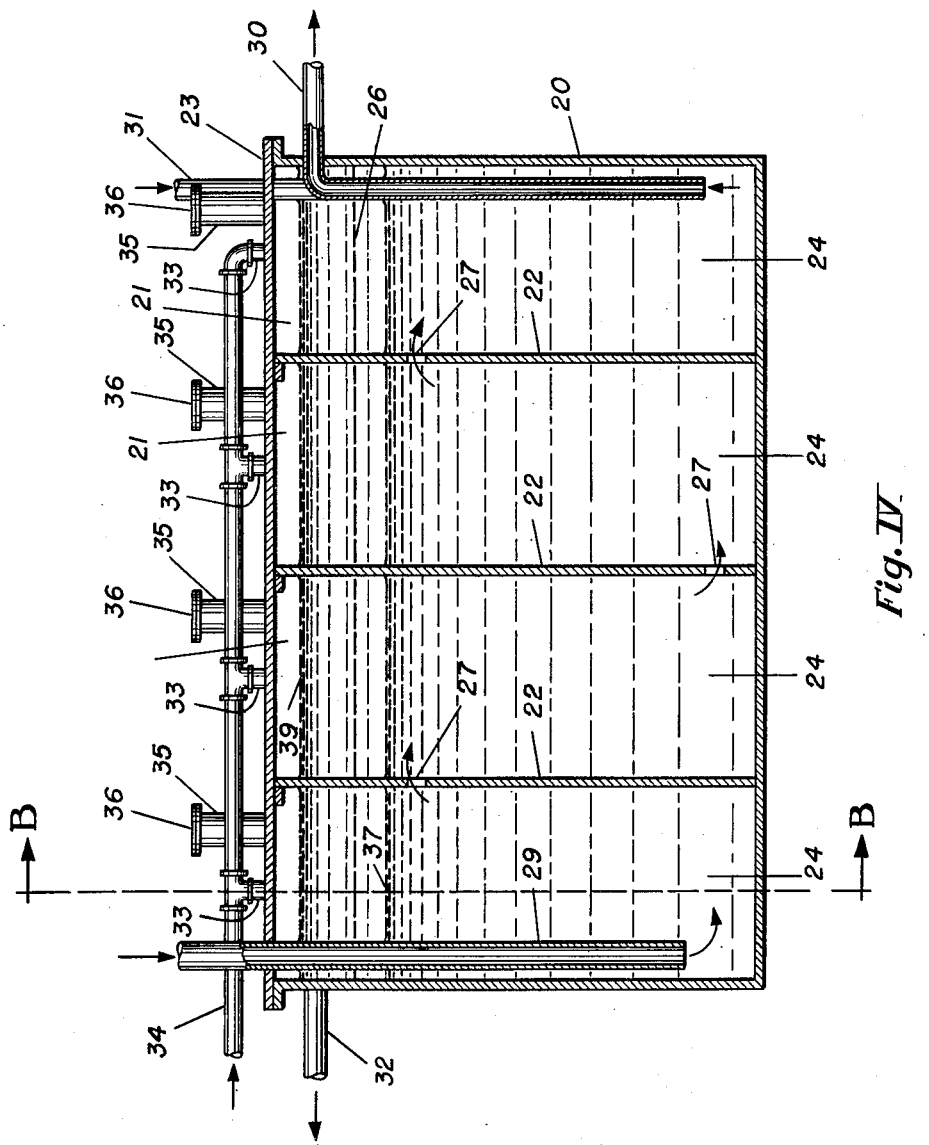
Fig. IV
INVENTOR.
CHARLES H. LEMKE
BY
ATTORNEY Dec. 12, 1950  C. H. LEMKE  2,533,593
CATION EXCHANGE PROCESS
Filed Feb. 11, 1948  4 Sheets-Sheet 4
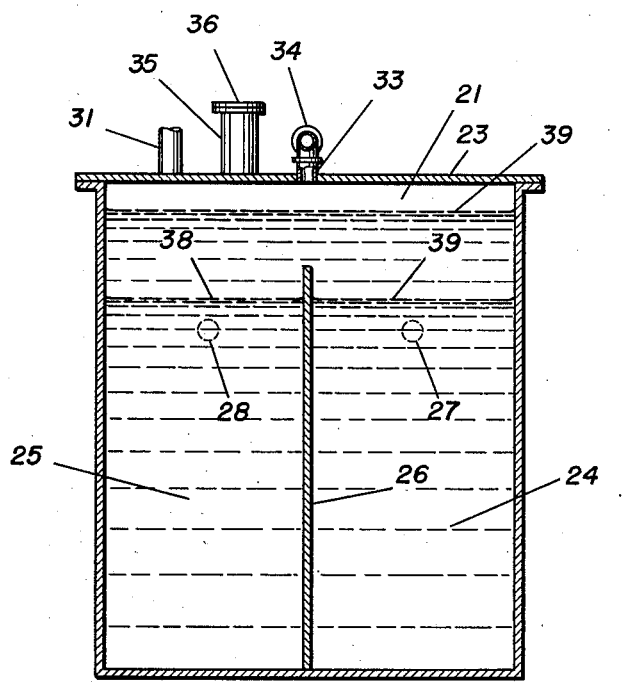
Fig. V
INVENTOR.
CHARLES H. LEMKE
BY
ATTORNEY Patented Dec. 12, 1950

2,533,593

UNITED STATES PATENT OFFICE 2,533,593

CATION EXCHANGE PROCESS

Charles H. Lemke, Niagara Falls, N. Y., assignor to E. I. du Pont de Nemours & Company, Wilmington, Del., a corporation of Delaware Application February 11, 1948, Serial No. 7,585

13 Claims. (Cl. 23—79)

This invention relates to reactions involving alkali metal salts and more particularly to a process for converting a metal compound to a different metal compound having the same anion, by metathetical reaction. An example is conversion of sodium cyanide to potassium cyanide by the reaction:

$$NaCN + KCl \rightarrow NaCl + KCN$$

Sodium cyanide may be made cheaply by the well-known Castner process from metallic sodium, carbon and ammonia. When it is desired to produce potassium cyanide it is more economical first to make sodium cyanide and convert the latter to potassium cyanide by reacting with a potassium salt. Heretofore, in carrying out such metathetical reactions, mixed products were obtained. For example, by reacting potassium chloride with sodium cyanide whether in solution or as molten salts, a mixture of sodium and potassium cyanides and chlorides is formed, since under conventional conditions the reaction is reversible: $NaCN + KCl \rightleftharpoons NaCl + KCN$. In order to obtain a product rich in KCN, that compound or NaCl must be separated from the reaction mixture by some means, e. g. fractional crystallization. Such separations usually are tedious and expensive and it is impracticable to use such method to produce a substantially chloride-free potassium cyanide.

An object of the present invention is to conduct metathetical reactions between metal compounds having different cations and different anions, to produce end-products substantially free from mixed anions. Another object is an improved method for exchange of cations between metal compounds without exchange of anions. Another object is an improved method for converting sodium cyanide to potassium cyanide or to a mixture of sodium and potassium cyanides which is substantially free from anions other than cyanide. Still other objects and adaptations of the invention will become apparent from the following description.

The appended drawings illustrate apparatus for specific modes of practicing the invention. Fig. 1 is a diagrammatic representation of a reactor. Fig. 2 is the vertical section of another reactor. Figs. 3, 4 and 5 are different views of a third reactor. Fig. 3 is a plan or top view of the reactor. Fig. 4 is a vertical section at AA of Fig. 3 and Fig. 5 is a vertical section at BB of Fig. 4.

One method of carrying out the present invention will be described with reference to Fig. 1 of the appended drawings. The H-shaped reactor consists of two vertical containers or receptacles 1 and 2, joined by a connecting pipe or closed channel 3. The reactor may be provided with suitable closures for receptacles 1 and 2, means for introducing and maintaining an atmosphere of inert gas therein and means for heating the reactor not shown. Receptacle 1 is filled with molten potassium chloride to a point just below the connection pipe 3. Receptacle 2 is filled with molten sodium cyanide to the same height. Molten sodium, potassium or sodium-potassium alloy is then placed in the apparatus to a height just above pipe 3. The space above the molten metal or alloy in receptacles 1 and 2 is maintained in an atmosphere of nitrogen by conventional means not shown. The contents of the reactor are maintained at a temperature above the melting point of the highest melting compound or mixture until equilibrium has been obtained, which will require from about 30 to 60 minutes. This may be accomplished, for example, by heating the reactor in a suitable furnace at about 750–800° C. The alkali metal or alloy containing sodium reacts with the salt in receptacle 1 to convert potassium chloride to sodium chloride, thus releasing metallic potassium which enters the alloy. At the other side of the apparatus in receptacle 2, the potassium in the alloy reacts with sodium cyanide to form potassium cyanide. Thus the following reversible reactions simultaneously occur:

In receptacle 1:
$$Na + KCl \rightleftharpoons NaCl + K$$
In receptacle 2:
$$K + NaCN \rightleftharpoons KCN + Na$$

If either pure sodium or potassium is initially charged it is converted to a sodium-potassium alloy when equilibrium is reached. Also, at equilibrium, the material in receptacle 1 is a mixture of sodium and potassium chloride and that in receptacle 2 is a mixture of sodium and potassium cyanides. By removing the salt mixture from receptacle 1 and replacing it with fresh potassium chloride and repeating the above operation, a further quantity of the sodium cyanide in receptacle 2 is converted to potassium cyanide. Each time the process is thus repeated, the contents of receptacle 2 become richer in potassium cyanide and poorer in sodium cyanide. If the operation is repeated a sufficient number of times the end-product in receptacle 2 is substantially pure potassium cyanide, containing only a trace or negligible amount of sodium salts and altogether free from chloride. If desired, the process may be terminated at any desired point to obtain a mixture of potassium and sodium cyanides. In any case, the material removed from the receptacle 2 will be free from chloride and the material removed from receptacle 1 will be free from cyanide.

The result is that, without the application thereto of any electrical or mechanical energy, the sodium and potassium atoms in the alkali metal layer in pipe 3 are transferred between receptacles 1 and 2, sodium atoms flowing from receptacle 2 to receptacle 1 and the potassium atoms flowing in the opposite direction. This transverse flow of metal atoms stops when equilibrium is reached. The alloy layer in pipe 3 thus serves as a bridge, over which the metals cross from one reaction to the other; hence I have denoted this novel cation exchange process the "alloy bridge" method or process.

Figure 2 illustrates one type of reactor which may be utilized for carrying out the process as a batch operation as described above with reference to Fig. 1 or for practicing the invention as a continuous process. The reactor comprises a cylindrical, round bottomed pot 4, which is divided into two compartments 15 and 16 by the vertical baffle or partition 5, which rises from the bottom of the pot to within a short distance of the top. Each of the two compartments is provided with overflow outlet pipes 6 and 7 and with baffles 8 and 9 which surround the openings to the outlet pipes. The pot is provided with a cover 10 which carries inlet pipes 11 and 12, each leading into one of the two compartments 15 and 16. Cover 10 also is provided with charging port 13 which has a removable cover and a gas inlet pipe 14. The entire reactor is mounted in a suitable furnace or otherwise provided with heating means so as to maintain the contents molten.

In operation, a quantity of potassium chloride is charged into the pot in compartment 15 on one side of partition 5 and a quantity of sodium cyanide into compartment 16 on the other side of said partition. Heat is applied to melt these salts, and further quantities of potassium chloride and sodium cyanide are added as required to bring the level of the molten salts up to a point a short distance below the top of partition 5, up to the openings into outlet pipes 6 and 7.

Cover 10 then is fitted on the pot and the air in the space above the molten salt is removed by passing substantially oxygen-free nitrogen in through pipe 14, port 13 being uncovered to permit escape of the gases. A quantity of sodium is then charged through port 13 in such quantity as to form a layer of the molten metal rising to a level above partition 5. In place of the sodium, either pure potassium or sodium-potassium alloy may be utilized. I prefer to charge the reactor with sodium since it is cheaper and more readily available than potassium or sodium-potassium alloys.

At this stage of operation, the levels of the molten salts and alloy are as indicated in the drawing, the salt-alloy interfaces 17 and 18 lying below the top of partition 5 and the alloy level 19 lying above the top of said partition. The space above the molten alloy is kept filled with nitrogen supplied through pipe 14 at slightly above atmospheric pressure, e. g. at 0.5 to 1 lb. per square inch gage.

Operation is now continued by continuously introducing molten potassium chloride and sodium cyanide into the reactor by way of pipes 11 and 12, respectively, the chloride flowing into compartment 15 and the cyanide into compartment 16. The rates of flow may be varied as desired, to produce as product flowing from pipe 6, a mixture of potassium and sodium cyanides containing varying amounts of potassium cyanide or substantially pure potassium cyanide. In order to produce a product containing 90 molar percent or more of potassium cyanide, the molar ratio of potassium chloride to sodium cyanide fed into the reactor should be in the neighborhood of 8:1 to 9:1. The effluent from pipe 7 then will be a mixture of sodium and potassium chlorides containing in the neighborhood of 9 molar percent of sodium chloride.

In the above operation, the contents of the reactor are maintained at a temperature sufficiently high to maintain all components in the molten state, e. g. a temperature of 750 to 800° C. In place of external heating, if desired, the contents may be heated by conventional immersion type heaters located in each of the two compartments 15 and 16.

If desired, the apparatus of Fig. 2 may be operated semi-continuously, wherein after both compartments have been charged with chloride and cyanide as above described and covered with the layer of sodium-potassium alloy to form the alloy bridge, potassium chloride is fed into the chloride compartment without any feed of cyanide into the cyanide compartment. In this mode of operation, the potassium chloride feed may be continued until the potassium cyanide content of the cyanide compartment has reached any desired point, up to 100% potassium cyanide. The contents of the cyanide compartment then may be removed by any convenient means, for example, by pumping out or by gravity flow. For this purpose the reactor may be fitted with suitable conventional outlet connections not shown in the drawing, as will be obvious to a skilled engineer.

The apparatus illustrated by Figs. 3, 4 and 5 of the appended drawings also may be employed to carry out the reaction in a continuous manner, e. g., to convert sodium cyanide to a potassium cyanide product containing 90% or more of KCN. This apparatus has a rectangular tank 20 separated into a plurality of chambers 21, by means of partitions 22. Tank 20 and chambers 21 are covered by a cover plate 23. Each chamber 21 is divided into two compartments 24 and 25 by means of baffle 26, which rises from the floor of tank 20 to within a short distance of the cover plate 23. Adjacent compartments 24 are inter-connected by means of openings 27 in partitions 22; and compartments 25 are similarly inter-connected by openings 28. These openings 27 and 28 are in staggered relationship, as shown in Fig. 4, being located near the tops and bottoms of adjacent partitions. At one end of the reactor, feed pipe 29 extends into the end compartment 24 to a point near the bottom of tank 20. At the opposite end of the reactor, outlet pipe 30 leads from the bottom of the opposite end compartment 24 through the end-wall of tank 20. Feed pipe 31 and outlet pipe 32 are similarly arranged in respect to compartments 25, feed pipes 31 and 29 being at opposite ends of the reactor.

The cover plate 23 has a series of gas inlet pipes 33, one leading into each chamber 21. Pipes 33 are connected to a common manifold 34, Also, cover plate 23 is provided with a series of metal feed ports, one opening into each chamber 21. Each port consists of a short flanged pipe 35, provided with a removable cover 36. The whole reactor is mounted in a suitable furnace, not shown, or is otherwise provided with conventional means for heating the contents.

In operation, for example, to produce potassium cyanide from sodium cyanide, molten sodium cyanide is fed in pipe 29 until all the compartments 24 are filled with the molten cyanide to a level intermediate to the upper openings 27 and the tops of baffles 26. Molten potassium chloride is likewise introduced through pipe 31, filling compartments 25 to the same level. Sufficient heat is applied to keep the salts molten, e. g. at a temperature of 750–800° C. With covers 36 removed or partly opened, substantially oxygen-free nitrogen then is passed in through manifold 34 until all air in the space above the molten salts in each chamber 21 has been displaced by the nitrogen. A quantity of sodium or sodium-potassium alloy then is charged into each compartment 21 through pipes 35 to bring the alloy level well above the tops of baffles 26, the alloy floating on the molten salts, as shown in Figs. 4 and 5, wherein numerals 37 and 38 represent the salt-alloy interfaces and 39 the upper surface of the alloy. Covers 36 then are replaced and a small nitrogen pressure is maintained in manifold 34, sufficient to prevent entrance of air through any leak that may develop. Thereafter, molten sodium cyanide and molten potassium chloride are continuously fed in through pipes 29 and 31, respectively, at constant rates of flow, causing molten salts continuously to flow out through pipes 30 and 32.

In compartments 24 and 25, the molten salt enters near the bottom (or top) of each compartment and leaves near the top (or bottom), by passage through the staggered holes 27. Thus in compartments 24, the salt enters via pipe 29 near the bottom of the end compartment, passes upwardly and through hole 27 into the top of the next compartment, thence downwardly and through the next hole 27 into the lower portion of the third compartment, thence upwardly and into the upper part of the last compartment, whence it flows downwardly and into the open end of outlet pipe 30. The same manner of flow occurs in compartments 25 on the other sides of baffles 26. This manner of flow, together with the regulated, constant feed rates causes a continuous salt flow past the salt alloy interfaces and insures that each increment of salt resides in the compartment for a time sufficient to substantially establish equilibrium conditions. The feed rates into pipes 29 and 31 will vary, depending upon the desired potassium content of the product and the number of chambers 21 in the reactor. In a four-chambered reactor as shown in the drawings, to produce a product containing at least 90 molar percent of potassium cyanide, the molar ratio of potassium chloride feed to sodium cyanide feed should be from about 1.2:1 to 1.4:1 when the cyanide feed rate is such as to result in a residence time in each compartment 24 of not less than 60 minutes.

The salt issuing from pipe 30 at first is mainly sodium cyanide, containing a small amount of potassium cyanide, but progressively becomes richer in potassium cyanide. When equilibrium has been reached, the product flowing from pipe 30 will have a maximum potassium cyanide content and is substantially free from chlorides. When the cyanide feed in pipe 29 is commercial 96% sodium cyanide, the product is 90–95 molar percent potassium cyanide, containing around 1 to 5 molar percent of sodium cyanide, the remainder being carbonate which was present in the sodium cyanide fed into pipe 29. By increasing the number of reaction chambers 21, the sodium content of the pipe 30 effluent can be further decreased.

The effluent from pipe 32, at equilibrium is a mixture of sodium and potassium chlorides. When sodium cyanide of 96% by weight purity is fed into pipe 29 and potassium chloride of 98% by weight purity is fed into pipe 31, and conditions are such that the potassium cyanide content of pipe 30 effluent is 96 molar percent, the sodium chloride content of the pipe 32 effluent will be about 47 molar percent.

Referring again to Figs. 4 and 5, in any chamber 21 the molten salts in compartments 24 and 25 do not come into contact with each other, but both are in contact with the common floating layer of alloy, which forms the "alloy bridge" between the salts in the two compartments. Also, the partitions 22 between the chambers prevent the alloy bridge of any chamber 21 from contacting the alloy in an adjacent chamber.

Sodium and potassium atoms are carried in opposite directions across the alloy bridges and the following reactions occur:

In compartments 24: 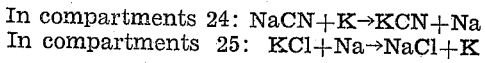
In compartments 25: 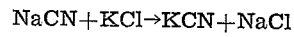

The net result is carrying to or towards completion the reaction:

$$NaCN + KCl \rightarrow KCN + NaCl$$

Various other means for practicing the invention as a continuous-flow process for conversion of sodium cyanide to potassium cyanide will be apparent from the above examples. In any such continuous mode of operation, the chloride and cyanide melts will flow through separate compartments, and the two melts, out of direct contact with each other, are maintained in contact with a common body of molten sodium-potassium alloy, or "alloy bridge." There may be a plurality of such compartment-pairs, as illustrated by Figs. 3, 4 and 5, and each may have one or more alloy bridges. If desired, various conventional means for intimately contacting immiscible liquids may be utilized for extending the effective area of interface between the salts and the alloy, for example, by stirring, or by forcing some of the alloy underneath the interface and permitting it to rise back in thin streams or globules.

It will be obvious from the foregoing that the process may be employed to produce mixtures of sodium and potassium cyanides in any desired proportions. Such mixtures are often valuable commercial products useful, for example, in certain electroplating operations where both potassium and sodium ions in the electrolyte are desirable and in certain heat treating and case hardening operations which employ molten baths containing both cyanides. Likewise, the mixtures of sodium and potassium chlorides obtainable as by-products in my process are useful for making up various molten salt baths for treating steel and other metals.

In place of the potassium chloride used in the above process, I may utilize the other potassium halides or other fusible potassium compounds, e. g., potassium hydroxide, carbonate, sulfide, dihydrogen orthophosphate, and the like. Likewise, other alkali metal cyanides may be produced by substituting for the potassium compound a fusible salt or compound of another alkali metal, i. e., of Li, Cs or Rb.

Further, the process may be used to produce various mixed cyanides by reacting sodium cyanide (or other alkali metal cyanide) with a mixture of salts or compounds of a plurality of other alkali metals. For example, by using a mixture of LiCl and KCl in place of KCl in the above process, I may obtain as a product a ternary mixture of NaCN, KCN and LiCN or a binary mixture consisting substantially of KCN and LiCN. Hence, the alloy bridge is not restricted to binary alloys, as in this case it is a ternary alloy of Na, K and Li. In any case, the composition of the alloy, and the proportions of the metals therein is thus dependent on the nature and proportions of the metal compounds fed to the reactor.

While the invention has been described with reference to the conversion of sodium cyanide to potassium cyanide it is not so restricted but can be employed in similar manner to convert any fusible alkali metal compound to another fusible alkali metal compound having the same anion. Thus, for example, by this method potassium hydroxide may be reacted with sodium cyanide to form potassium cyanide and sodium hydroxide as by-product. Likewise, sodium chloride may be reacted with potassium carbonate to form potassium chloride and sodium carbonate. Still other reactions which can be carried out according to this method are indicated by the following table:

selected as the desired product. For example, in the fourth equation above, the process may be operated to produce:

(a) $Ca(CN)_2$ by reacting $NaCN$ with $CaCl_2$,
(b) $CaCl_2$ by reacting $Ca(CN)_2$ with $NaCl$,
(c) $NaCl$ by reacting $NaCN$ with $CaCl_2$, or
(d) $NaCN$ by reacting $NaCl$ with $Ca(CN)_2$ Thus my alloy bridge process may be used to force the reversible metathetical reactions in either direction, and to any desired extent, to produce various mixtures of products having common anions or to obtain one product of high purity.

A prime advantage of the herein cation exchange process is that cation exchange is effected without suffering anion exchange to occur. Hence the product is never contaminated with foreign anions. For example, the reaction: $NaCN + KCl \rightarrow KCN + NaCl$ may be carried out to produce a KCN product which is not contaminated by chlorides. Heretofore this result could be accomplished only by first producing metallic potassium and then reacting it with NaCN. But the only economical way to make potassium is by reacting metallic sodium with KCl or KOH and distilling to separate K from Na. Hence the prior art method for making chloride-free KCN from NaCN would entail the following separate operations:

1. Electrolysis of NaCl to produce Na metal
2. $KCl + Na \rightarrow NaCl + K$ (separated by distillation)
3. $K + NaCN \rightarrow KCN + Na$ With my process the same result, a cyanide product uncontaminated with chloride or other foreign anion, is obtained in a single operation

| Product | By-Product | Alloy Bridge | Reaction |
|---|---|---|---|
| KOH | NaCl | Na-K | $KCl + NaOH \longrightarrow KOH + NaCl$ |
| LiOH | do | Na-Li | $LiCl + NaOH \longrightarrow LiOH + NaCl$ |
| $Na_2O$ | $CaCl_2$ | Ca-Na | $CaO + 2NaCl \longrightarrow Na_2O + CaCl_2$ |
| NaCN | do | do | $Ca(CN)_2 + 2NaCl \longrightarrow 2NaCN + CaCl_2$ |
| KCN | do | Ca-K | $Ca(CN)_2 + 2KCl \longrightarrow 2KCN + CaCl_2$ |
| $NaCN_2$ | do | Ca-Na | $CaCN_2 + 2NaCl \longrightarrow Na_2CN_2 + CaCl_2$ |
| $CaH_2$ | CaCl | do | $CaCl_2 + 2NaH \longrightarrow CaH_2 + 2NaCl$ |
| $MgCl_2$ | CaO | Mg-Ca | $MgO + CaCl_2 \longrightarrow MgCl_2 + CaO$ |
| $Na_2O$ | HgCl | Hg-Na | $2NaCl + Hg_2O \longrightarrow Na_2O + 2HgCl$ |
| $Na_2CO_3$ | $CaCl_2$ | Ca-Na | $2NaCl + CaCO_3 \longrightarrow Na_2CO_3 + CaCl_2$ |
| PbCl | $Na_2O$ | Pb-Na | $PbO + 2NaCl \longrightarrow PbCl_2 + Na_2O$ |
| $BaCl_2$ | $Na_2SO_4$ | Ba-Na | $BaSO_4 + 2NaCl \longrightarrow BaCl_2 + Na_2SO_4$ |

In systems where the alloy is heavier than the molten salts, for example, where the alloy bridge is an alloy of lead or mercury, the apparatus is suitably modified so that the salt floats on the alloy.

In the case of infusible or unduly high melting materials used as raw materials, for example, CaO, $CaCO_3$, clay, $Ba_2SO_4$, PbO, MgO, HgO and the like, these materials may be handled by dissolving or dispersing them in melts not incompatible with the desired result, e. g., melts of compounds of the opposite cation. For example, for reacting NaCl with $CaCO_3$ to produce $Na_2CO_3$, powdered limestone dispersed in molten $Na_2CO_3$ may be fed to one side of a Ca-Na alloy bridge and molten NaCl fed to the other side. $Na_2CO_3$ or other sodium salts may be added to the NaCl if desired to lower the melting point. Similarly, many infusible compounds may be dissolved in molten sodium carbonate or other well known fluxes, and such solutions may be used in my process.

With reference to the chemical equations in the above table, it will be obvious that any one of the four components in each equation may be which may be carried out in an economical, continuous-flow manner.

Alkali metal cyanide and mixtures thereof made by the present invention are especially valuable for cyanide electroplating baths, because of their complete freedom from chlorides, which generally are detrimental in cyanide plating operations.

I claim:

1. The cation exchange process which comprises simultaneously contacting a body of a molten alloy of two metals with two separated molten masses, one containing a compound of one of the metals of said alloy and the other a compound of the other metal and a different anion, whereby said compounds react with said alloy to form molten cation exchanged products, and removing said products from contact with the alloy.

2. The cation exchange process which comprises simultaneously contacting a body of a molten alloy of two metals with two separated molten masses, one containing a compound of one of the metals of said alloy and the other a compound composed of the other metal and a different anion, feeding each of said compounds separately into the mass containing it and in such relative amounts of one in excess of the other that the reaction proceeds in the desired direction, and withdrawing cation exchanged reaction products from said masses.

3. The cation exchange process which comprises contacting in molten state two metal compounds having different anions and different cations with a body of a molten alloy of the two different metals constituting the cations, said alloy being maintained in contact with separated molten masses of cation exchanged products, feeding each of said compounds so that its product of the exchange reaction will enter the mass of the product having the anion thereof and in such relative amounts of one in excess of the other that the reaction proceeds in the desired direction, and withdrawing the reaction products from the molten product masses.

4. The process according to claim 3, wherein the two metal compounds are compounds of two different alkali metals and the alloy is an alloy of said alkali metals.

5. The process according to claim 3, wherein the two metal compounds are sodium cyanide and potassium chloride, the alloy is sodium-potassium alloy and the potassium chloride is fed in excess of the sodium cyanide, so as to cause the reaction to proceed in the direction resulting in conversion of sodium cyanide to potassium cyanide.

6. The cation exchange process which comprises simultaneously contacting a body of a molten alloy of two metals with two separated molten compounds having different cations and different anions, the cations of said compounds being identical with the metals of said alloy, whereby said compounds react with said alloy to form molten cation exchanged products, and removing at least one of said products from contact with the alloy.

7. The cation exchange process which comprises simultaneously contacting a body of a molten alloy of two alkali metals with two separated molten alkali metal salts having different cations and different anions, the cations of said salts being identical with the metals of said alloy, whereby said salts react with said alloy to form molten cation exchanged products and removing at least one of said products from contact with said alloy.

8. The process of claim 7 wherein one of said salts is sodium cyanide and the other is potassium chloride, and whereby the cation exchange occurs so as to convert at least a portion of the sodium cyanide to potassium cyanide.

9. The process for converting a first metal compound into a second metal compound having the same anion which comprises continuously flowing in substantially opposite directions a molten stream of said first metal compound and a molten stream of a metal compound having the cation of said second compound and an anion different than that of said first compound, said streams being arranged in generally parallel relationship but separated from each other, and connecting said parallel streams at a plurality of spaced apart points with separate bodies of molten alloy of the metals of said first and second compounds.

10. A cation exchange process for exchanging cations between two metal compounds having different cations and different anions which comprises continuously flowing separated streams of the two compounds in molten state in generally parallel relationship and in substantially opposite directions, connecting said parallel streams at a plurality of spaced apart points with separate bodies of molten alloy of the metals constituting the cations of said compounds.

11. The process for converting sodium cyanide into the cyanide of another alkali metal which comprises continuously flowing in substantially opposite directions a stream of molten sodium cyanide and a stream of a molten non-cyanide compound of said other alkali metal, said streams being arranged in generally parallel relationship but separated from each other, and connecting said parallel streams at a plurality of spaced apart points with separate bodies of molten alloy of sodium and said other metal.

12. The process for converting sodium cyanide into potassium cyanide which comprises continuously flowing in substantially opposite directions a stream of molten sodium cyanide and a stream of a molten potassium salt other than cyanide, said streams being arranged in generally parallel relationship but separated from each other, and connecting said parallel streams at a plurality of spaced apart points with separate bodies of molten sodium-potassium alloy.

13. The process converting sodium cyanide into potassium cyanide which comprises continuously flowing in substantially opposite directions a stream of molten sodium cyanide and a stream of molten potassium chloride said streams being arranged in generally parallel relationship but separated from each other, and connecting said parallel streams at a plurality of spaced apart points with separate bodies of molten sodium-potassium alloy.

CHARLES H. LEMKE.

REFERENCES CITED

The following references are of record in the file of this patent:

Jander et al., Chemical Abstracts, vol. 32, p. 8899 (1938).